United States Patent [19]
Nicholas et al.

[11] Patent Number: 5,419,538
[45] Date of Patent: May 30, 1995

[54] NEWEL POST FASTENING SYSTEM

[76] Inventors: Thomas N. Nicholas, 383 E. U.S. Hwy. 6, Valparaiso, Ind. 46383; William C. Nicholson, 450 E. 1400 North, Chesterton, Ind. 46304

[21] Appl. No.: 210,567

[22] Filed: Mar. 18, 1994

[51] Int. Cl.6 .............................................. E04H 17/14
[52] U.S. Cl. ........................................ 256/65; 256/59; 256/69; 403/306; 403/258; 52/726.3
[58] Field of Search .................... 256/59, 65, 68, 69, 256/19, 1; 52/296, 298, 726.1, 726.2, 726.3, 726.4; 403/233, 258, 260, 307, 306, 337, 296, 299, 332, 292; 248/349

[56] References Cited

U.S. PATENT DOCUMENTS

| | | | |
|---|---|---|---|
| 930,607 | 8/1909 | Morrill | 52/165 |
| 2,108,398 | 2/1938 | Allen, III | |
| 2,820,262 | 1/1958 | Dunn | 52/298 |
| 3,057,991 | 10/1962 | Grenadier | 256/59 X |
| 4,032,244 | 6/1977 | Quayle | 403/306 X |
| 4,344,604 | 8/1982 | Basey | 256/65 |
| 4,352,485 | 10/1982 | Basey | 256/65 |
| 4,367,864 | 1/1983 | Eldeen | 256/59 |
| 4,403,767 | 9/1983 | Basey | 403/292 X |
| 4,587,788 | 5/1986 | Bielicki | 256/59 X |
| 4,753,420 | 6/1988 | Kaaria | 256/1 |
| 4,854,549 | 8/1989 | Roberts et al. | 256/69 |
| 4,869,467 | 9/1989 | Kellison | 256/64 |
| 4,952,092 | 8/1990 | Ballerstein | 256/69 X |

FOREIGN PATENT DOCUMENTS

| | | | |
|---|---|---|---|
| 8185827 | 10/1983 | Japan | 52/726.3 |
| 4146362 | 5/1992 | Japan | 256/1 |

OTHER PUBLICATIONS

Wahlfeld's Price Supplement #73, dated Dec. 11, 1990.

*Primary Examiner*—Eric K. Nicholson
*Assistant Examiner*—Harry C. Kim
*Attorney, Agent, or Firm*—Gary M. Hartman; Domenica N. S. Hartman

[57] ABSTRACT

An improved fastening system is provided for anchoring a post to a foundation, in which the fastening system is received and completely concealed within a recess formed between the post and the foundation. The fastening system of this invention also provides for an improved method for installing a post, by which the post is threadably secured to the foundation by being rotated relative to the foundation. The fastening system includes a first member securable to a lower surface of the post, and a second member securable to a surface of the foundation. Both the first and second members have a threaded bore therethrough, and are sized to have widths which are less than the diameter of the post. A threaded stud is threadably engagable with the threaded bores of the first and second members. For installation, the recess is formed in the lower surface of the post, the upper surface of the foundation, or both, so as to be sufficiently sized to receive the first and second members and the threaded stud.

20 Claims, 1 Drawing Sheet

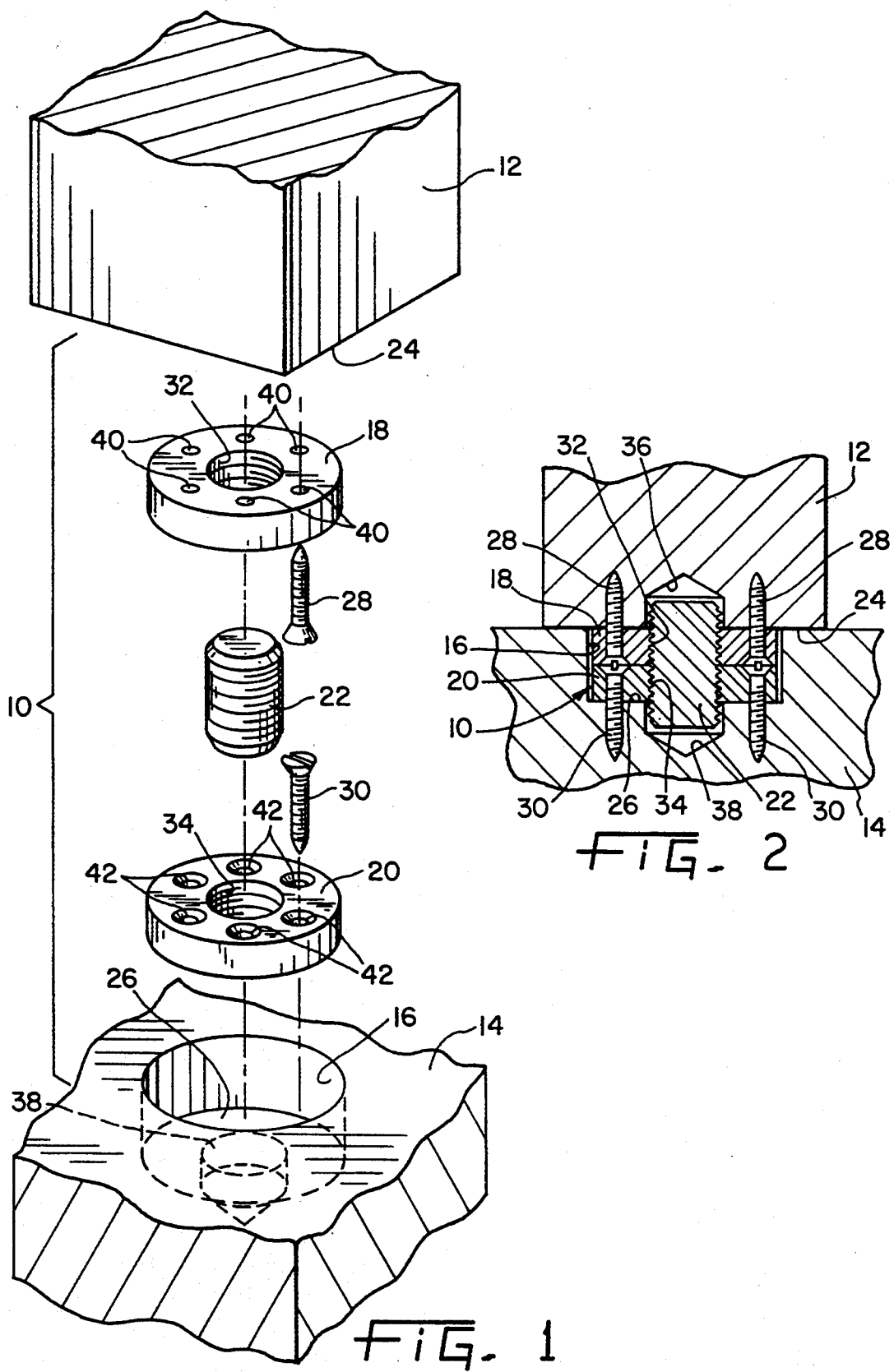

NEWEL POST FASTENING SYSTEM

The present invention relates to fastening systems for securing posts and the like to a base or mounting surface. More particularly, this invention relates to an improved fastening system for securing a staircase newel post to a mounting surface, in which the fastening system can be easily and quickly installed, requires no visible external access for installation, and has more than adequate anchoring strength for securely mounting a newel post in a staircase or balcony section.

BACKGROUND OF THE INVENTION

A newel post used in building construction is generally an upright post at the head or foot of a flight of stairs, and serves to support a handrail for the stairs. In view of the important structural and safety considerations for such applications, fastening hardware used to anchor a newel post to its foundation must be structurally strong and reliable. During new home construction, access to the underside of the floor allows the use of a long threaded screw to secure the newel post to the floor. However, it is not always feasible to anchor the newel post in this manner, particularly during remodeling when access to the underside of the floor is either impossible or undesirable.

Consequently, other types of conventional newel post fastening hardware have been developed in the art which do not require access through the underside of the floor, and therefore overcome the problems with the previously described hardware. One such example includes a long rod whose upper end is anchored in the newel post and whose lower end is anchored in a floor joist beneath the floor where the newel post is to be anchored. Each end of the rod is threaded, enabling the lower end to be threaded directly into the floor joist, while the upper end is threaded into a nut positioned at the end of a deep bore formed in the lower end of the newel post. An access hole through the side of the newel post is required to gain access to the nut for assembly and tightening. The structural integrity of this fastening hardware relies on the length of the rod being sufficient to withstand lateral forces on the newel post, requiring that the ends of the rod be deeply driven into the floor joist and the newel post. Consequently, a disadvantage with this type of fastening hardware is that its use is limited to situations in which a floor joist is located directly beneath the newel post which, as those skilled in the art will appreciate, is not always the case. Also, installation of the rod is labor intensive, particular in view of the extremely deep bores which must be formed in both the newel post and the floor joist prior to installing the rod. Finally, the access hole to the nut must later be filled with a plug which will remain noticeable and unattractive after installation.

For situations in which a floor joist is not available, the prior art has suggested fastening hardware which involves securing the perimeter of the lower end of the newel post to the floor. Generally, a vertical flange of a bracket is attached directly to the lower perimeter of the newel post, while a horizontal flange of the bracket is secured to the floor. A significant shortcoming of this type of fastening system is that the limited structural integrity of the fastening system, which relies on the ability to secure the bracket to the floor, and may require forming a hole through the floor beneath the newel in order to secure the horizontal flange with nuts and bolts. Another shortcoming is that the lower end of the newel post must be finished with trim in order to conceal the vertical flange attached to the newel post and the horizontal flange attached to the floor, resulting in limited aesthetic appeal.

From the above, it can be seen that the prior art does not teach a newel post fastening system which can provide suitable structural integrity and maximum design flexibility, and whose installation does not require access to the underside of the floor on which the newel post is to be mounted or access to or through the side of the newel post. Consequently, known newel post fastening systems often require the installer to compromise between structural integrity and aesthetic appearance, particular with installations during remodeling.

Therefore it would be advantageous to provide a newel post fastening system which can be readily and quickly installed in either new home construction or during remodeling, in that it does not require access to the underside of the floor on which the newel post is to be mounted or access to or through the side of the newel post. Furthermore, it would be advantageous if such a fastening system could offer maximum design flexibility in that its hardware is concealed as installed, so as not to require being concealed with trim. Finally, such a fastening system would preferably reduce the amount of labor required for installation, yet provide a structurally sound and reliable anchoring system.

SUMMARY OF THE INVENTION

It is an object of this invention to provide a fastening system for anchoring a post to a foundation, and particularly a newel post to a floor.

It is another object of this invention that such a fastening system be particularly suitable for use in both new home construction and remodeling, in that access to the underside of the floor is not required for installation.

It is a further object of this invention that such a fastening system provide maximum design flexibility in that its structure is entirely concealed between the post and the floor after installation, so as not to require concealment with finishing trim.

It is yet another object of this invention that such a fastening system reduce the amount of labor required for installation, yet provide a structurally sound and reliable anchoring system.

It is still a further object of this invention that such a fastening system provide a relatively low cost newel post fastening system for use in the housing industry.

In accordance with a preferred embodiment of this invention, these and other objects and advantages are accomplished as follows.

According to the present invention, an improved fastening system is provided for anchoring a post to a foundation. The fastening system is structured such that it can be completely received and concealed within a recess formed between the post and the foundation. The fastening system of this invention also provides for an improved method for installing a newel post, by which the post is threadably secured to its foundation solely by being rotated relative to the foundation.

The fastening system generally includes a first member securable to a lower surface of the post, and a second member securable to a surface of the foundation. The first and second members each have a threaded bore therethrough, and are sized to have widths which are less than the diameter of the post. A threaded stud is threadably engagable with the first and second threaded bores of the first and second members.

Installation of the fastening system involves first forming a recess located between the post and the foundation when the post is anchored to the foundation. The recess can be formed entirely within the foundation, the post, or a combination of the two. The first member is then secured to a lower surface of the post such that an upper surface of the first member abuts the lower surface of the post, and the second member is secured to a surface of the foundation such that a lower surface of the second member abuts an upper surface of the foundation. In the case where the recess is formed in the foundation, the second member is secured within the recess. Likewise, in the case where the recess is formed in the lower surface of the post, the first member is secured within the recess.

The threaded stud is then threadably engaged with the threaded bore of either the first or second member. The post is then positioned relative to the foundation such that the first member, the second member and the threaded stud are received within the recess located between the post and the foundation. The post is then mounted to the foundation by rotating the post relative to the foundation, such that the threaded stud threadably engages both the first and second threaded bores of the first and second members. The post becomes rigidly anchored to the foundation by rotating the post such that the first and second members are threaded toward each other, until the bottom of the post eventually abuts the foundation. As a result, the first member, the second member and the threaded stud are completely concealed within the recess between the post and the foundation.

From the above, it can be seen that an advantage to the present invention is that the fastening system can be readily installed in either new home construction or during remodeling, in that it is a completely blind fastening system and therefore does not require access to the underside of the floor on which the post is to be mounted. Use of the fastening system involves only a recess formed in either the lower surface of the post, the surface of the foundation to which the post is to be anchored, or a combination of both. The recess need not be a through-hole, but only sufficiently deep to completely receive both first and second members and the threaded stud.

In addition, installation of the fastening system of this invention does not require access to or through the side of the post. In particular, the post can be anchored to the foundation with nothing more than the first member being secured to its lower mounting surface, without any requirement to form a hole or bore in the post that will later require filling or covering. Consequently, maximum design flexibility for the post can be achieved in that finishing trim to conceal the fastening system is not required.

Another advantage to the present invention is that the fastening system significantly reduces the amount of labor required for installation, in that deep holes or bores are not required in the foundation or the post in order to provide a structurally sound and reliable anchoring system. Consequently, for installation in a home that has been framed in a conventional manner, subframing is not required beneath the post for securing a long threaded rod. Finally, the minimal number of components required for the fastening system, as well as the above-mentioned advantages, result in a uncomplicated, readily usable, low-cost fastening system which is highly suited for use in the housing industry.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawing wherein:

FIG. 1 is an exploded view of a newel post fastening system in accordance with a preferred embodiment of this invention; and FIG. 2 is a cross-sectional view of a newel post anchored to a mounting surface with the fastening system of FIG. 1.

DETAILED DESCRIPTION OF THE INVENTION

Illustrated in FIGS. 1 and 2 is an improved fastening system 10 in accordance with a preferred embodiment of this invention. The fastening system 10 is particularly adapted for anchoring a post, such as a newel post 12, to a foundation, such as a floor 14. As shown in FIG. 1, installation of the fastening system 10 results in the newel post 12 being anchored to the floor 14 without any externally visible hardware, and therefore eliminates the requirement for finishing trim around the base of the post 12. Access to the fastening system 10 via holes through the newel post 12 and floor 14 is also unnecessary during installation, such that plugs or finishing trim to cover or fill such holes are not required. Furthermore, the fastening system 10 is configured to be secured within a relatively shallow recess 16, and does not require deep bores through the newel post 12, floor 14 and subframing in order securely anchor the newel post 12.

Though this invention will be described in terms of a newel post 12 to be anchored to a floor 14, both of which are likely to be made from wood, it is entirely foreseeable that the fastening system 10 of this invention can be used for other and significantly different applications, such as street light poles and fence posts. Accordingly, this invention is not to be interpreted as being limited to the preferred embodiment shown in FIG. 1.

As illustrated in FIGS. 1 and 2, the fastening system 10 of this invention generally includes an upper collar 18, a lower collar 20 and a threaded stud 22. As shown, the upper collar 18 is secured to the lower surface 24 of the newel post 12 with a number of upper fasteners 28, while the lower collar 20 is secured to the upper surface 26 of the recess 16 with a number of lower fasteners 30. As is conventional, the fasteners 28 and 30 can be wood screws. Most preferably, the upper and lower fasteners 28 and 30 are each received in bores 40 and 42, respectively, formed in their respective collars 18 and 20. As shown, the bores 40 and 42 are located intermediate the perimeter of their respective collar 18 or 20 and a threaded bore 32 or 34 formed in its collar 18 or 20. Though the collars 18 and 20 are shown as being secured to the newel post 12 and floor 14 with the fasteners 28 and 30, it is entirely foreseeable that other fasteners and methods could be used or devised which would suitably anchor the collars 18 and 20 to their respective surfaces. For example, nails, adhesives or rivets could be used under some circumstances, depending in part on the construction of the newel post 12 and the floor 14.

However, it is believed that the threaded fasteners 28 and 30 will provide the greatest stability and strength to the newel post 12 in most applications.

Though the upper and lower collars 18 and 20 may have any external shape, they are preferably disk-shaped which, due to the presence of the threaded bores 32 and 34, results in each of the collars 18 and 20 having a substantially annular shape. Regardless of the peripheral shape, the maximum width of the upper and lower collars 18 and 20 is less than the diameter of the newel post 12 at its lower surface 24 in order to ensure that the fastening system 10 will be completely concealed by the newel post 12 once installed. Accordingly, the maximum width or diameter of the collars 18 and 20 may vary considerably depending on the application. It is anticipated that collars 18 and 20 having diameters of about 1 15/16 inches (roughly 4.9 centimeters) will be suitable for most home construction applications. The circular perimeters of the annular-shaped collars 18 and 20 illustrated are particularly suitable for maximizing stability and strength when installed in a recess 16 formed with a drill bit, as will typically be the case.

The threaded stud 22 is threadably engaged in the threaded bores 32 and 34 formed centrally in the upper and lower collars 18 and 20, respectively. For purposes of strength and stability, the diameter of the stud 22 is preferably on the order of about ¾ inch (roughly 2 centimeters), though studs 22 having a larger or smaller diameter could foreseeably be used. In order to facilitate the installation of the fastening system 10, it is preferable that the length of the stud 22 exceed the combined thicknesses of the collars 18 and 20, as measured in a direction perpendicular to their widths. In practice, a length of about 1 inch (roughly 2.5 centimeters) for the stud 22 has been found to be suitable when using collars 18 and 20 whose individual thicknesses are on the order of about ⅜ inch (roughly 1 centimeter). As shown, a pair of shallow bores 36 and 38 are preferably formed in the newel post 12 and the floor 14, respectively, in order to accommodate the length of the stud 22.

To promote the structural strength and stability of the fastening system 10, the upper and lower collars 18 and 20 and the stud 22 are preferably formed from ferrous metals, including low carbon steels such as SAE 1018. However, it is foreseeable that other steels, non-ferrous metals and some engineering plastic materials could also be suitable used for some applications.

The depth of the recess 16 in the floor 14 is preferably equal to or less than the combined thicknesses of the collars 18 and 20, i.e., about ¾ inch (roughly 2 centimeters). Alternatively, as noted above, the recess 16 could be formed entirely in the lower surface 24 of the newel post 12, or formed by a pair of opposing recesses formed in the lower surface 24 of the newel post 12 and the surface of the floor 14. Generally, it will be more convenient to form the recess 16 entirely in either the newel post 12 or the floor 14.

As can be appreciated from the above discussion, installation of the fastening system 10 of this invention is uncomplicated and can be completed in a matter of minutes. Generally, installation is initiated by forming the recess 16 between the newel post 12 and the floor 14. As noted before, the recess 16 is preferably formed entirely in the floor 14, as shown, or entirely in the lower surface 24 of the newel post 12. Furthermore, where the newel post 12 or floor 14 is made of wood, a drill can be quickly used to form the recess 16. When drilling, it will be generally more convenient if the pair of shallow bores 36 and 38 are first formed in the newel post 12 and recess 16, respectively, prior to forming the recess 16 in order to enable the appropriate bore 36 or 38 to serve as a pilot when drilling the recess 16.

The upper collar 18 is then secured to the lower surface 24 of the newel post 12 with the upper fasteners 28, such that its upper surface abuts the lower surface 24. Similarly, the lower collar 20 is secured to the surface 26 within the recess 16, such that its lower surface abuts the surface 26. The stud 22 is then threadably engaged with either of the threaded bores 32 or 34 in the upper or lower collars 18 or 20. For example, the stud 22 can be threaded into the threaded bore 34 of the lower collar 20 until it abuts the bottom of its corresponding shallow bore 38 in the recess 16, such that the stud 22 cannot be further threaded into the bore 38.

The newel post 12 is then positioned relative to the floor 14 and recess 16 such that the collars 18 and 20 and the stud 22 are all axially aligned, so as to allow the threaded bore 32 in the upper collar 18 to be threadably engaged with the stud 22. The newel post 12 is then rotated relative to the floor 14 such that the stud 22 threads into the threaded bore 32 in the upper collar 18. Further rotating of the newel post 12 ultimately results in the post 12 being firmly anchored to the floor 14 as a result of the collars 18 and 20 being threaded toward each other on the stud 22, until the newel post 12 abuts the floor 14 and, to some degree, the lower surface of the upper collar 18 contacts the upper surface of the lower collar 20. As a result, the lower surface of the upper collar 18 and the upper surface of the lower collar 20 serve as opposing bearing surfaces which slidably engage each other as the newel post 12 is being rotated. In so doing, rubbing between the newel post 12 and the floor 14 is minimized, which might otherwise damage the surface of the floor 14. However, where damage to the floor 14 is not a concern, it may be preferable to form the recess 16 deep enough to prevent the upper and lower collars 18 and 20 from contacting each other during installation, such that additional stability and rigidity can be achieved by clamping the lower surface of the newel post 12 firmly against the floor 14 with the fastening system 10.

In any event, once installation is completed, the collars 18 and 20 and the stud 22 are completely concealed within the recess 16 between the newel post 12 and the floor 14. To assure that the angular position of the newel post 12 is proper for mating with any surrounding structure, such as the handrail of a staircase, it is important that the thread pitch of the stud 22 be sufficiently fine such that the stud 22 will thread onto the collars 18 and 20 at a rate which will enable slight rotation of the newel post 12 in order to enable minute final adjustments. In practice, for a ¾ inch diameter stud 22, a fine thread pitch of 16 threads per inch has been found to enable suitably precise adjustments.

From the above, it can be seen that a significant advantage of this invention is that the fastening system 10 can be readily installed in either new home construction or during remodeling, in that it is a completely blind fastening system and therefore does not require access to the underside of the floor 14 on which the newel post 12 is to be mounted. Use of the fastening system 10 requires only the formation of the recess 16, which can formed in the lower surface 24 of the post 12, the surface of the floor 14 over which the post 12 is to be anchored, or a combination of the two. Furthermore, the recess 16 need not be a through-hole, but only sufficiently deep to completely receive both collars 18 and 20 and the stud 22.

Another significant advantage of this invention is that the installation of the fastening system 10 does not require access to or through the side of the newel post 12, as is required by some prior art fastening systems. In particular, the newel post 12 is anchored to the floor 14 by securing the upper collar 18 to the lower surface 24 of the newel post 12, without any requirement to form a hole or bore in the post 12 that will later require filling or covering. Consequently, maximum design flexibility for the newel post 12 can be achieved in that finishing trim is not required to conceal the fastening system 10.

In addition, the fastening system 10 significantly reduces the amount of labor required to anchor the newel post 12 to the floor 14, in that deep holes or bores are not required in the floor 14, the floor's subframing, or the post 12 in order to provide a structurally sound and reliable anchoring system. Consequently, under some circumstances the fastening system 10 of this invention can be installed even if subframing is not present below the floor 14 to which the newel post 12 is to be mounted. In particular, subframing below the floor 14 is not required for accommodating and securing a long threaded anchoring rod, as is often required in the prior art.

Finally, a significant advantage of this invention is that the fastening system 10 is uncomplicated and requires minimal time for installation. As a result, the fastening system 10 can be manufactured at relatively low cost and can be quickly installed using a few basic tools, features which make the fastening system 10 highly suitable for use in the housing industry.

While our invention has been described in terms of a preferred embodiment, it is apparent that other forms could be adopted by one skilled in the art, such as by modifying the geometry and dimensions of the collars 18 and 20 and the stud 22; or by securing the collars 18 and 20 to their respective surfaces by methods other than the fasteners 28 and 30 shown; or by utilizing different materials, such as for the collars 18 and 20 or the stud 22; or by employing the fastening system 10 of this invention in applications other than securing a newel post 12 to a floor 14. Accordingly, the scope of our invention is to be limited only by the following claims.

The embodiments of the invention in which an exclusive property or privilege is claimed are defined as follows:

1. A fastening assembly for anchoring a post to a foundation such that the fastening assembly is received within a recess formed between the post and the foundation, the fastening assembly comprising:
   means for threadably anchoring the post to the foundation such that the post is secured to the foundation by being rotated relative to the foundation and such that the fastening assembly is concealed within the recess formed between the post and the foundation, the anchoring means comprising:
   a first member securable to a lower surface of the post, the first member having a first threaded bore therethrough and a width which is less than the diameter of the post, the first member having an upper surface for abutting the lower surface of the post;
   a second member securable to a surface of the foundation, the second member having a second threaded bore therethrough and a width which is less than the diameter of the post, the second member having a lower surface for abutting the surface of the foundation; and
   a threaded stud threadably engagable with the first and second threaded bores of the first and second members;
   whereby when the first member is secured to the lower surface of the post and the second member is secured to the surface of the foundation, the post is secured to the second member by being rotated so as to thread the first and second members toward each other, and whereby the fastening assembly is completely concealed within the recess between the post and the foundation.

2. A fastening assembly as recited in claim 1 further comprising:
   means for securing the first member to the post so as to abut the upper surface of the first member against the lower surface of the post; and
   means for securing the second member to the foundation so as to abut the lower surface of the second member against the surface of the foundation.

3. A fastening assembly as recited in claim 2 wherein the means for securing the first member to the post is intermediately located between a perimeter of the first member and the first threaded bore, and wherein the means for securing the second member to the foundation is intermediately located between a perimeter of the second member and the second threaded bore.

4. A fastening assembly as recited in claim 1 wherein the first threaded bore is centrally located in the first member and the second threaded bore is centrally located in the second member.

5. A fastening assembly as recited in claim 1 wherein the first and second members are annular-shaped disks.

6. A fastening assembly as recited in claim 1 wherein the first member has a bearing surface oppositely disposed from the upper surface of the first member, and wherein the second member has a bearing surface oppositely disposed from the lower surface of the second member, the bearing surface of the second member being slidably engagable with the bearing surface of the first member while the post is rotated relative to the foundation.

7. A newel post fastening assembly for anchoring a newel post to a floor such that the fastening assembly is received within a recess formed between a lower surface of the post and an upper surface of the floor, the fastening assembly comprising:
   a first member having a first threaded bore therethrough, a perimeter whose width is less than the diameter of the newel post, and a thickness in a direction perpendicular to the width of the first member, the first member having an upper surface for abutting the lower surface of the newel post and a bearing surface oppositely disposed from the upper surface of the first member;
   a second member having a second threaded bore therethrough, a perimeter whose width is less than the diameter of the newel post, and a thickness in a direction perpendicular to the width of the second member, the second member having a lower surface for abutting the upper surface of the floor and a bearing surface oppositely disposed from the lower surface of the second member, the bearing surface of the second member being slidably engagable with the bearing surface of the first member;

a threaded stud threadably engagable with the first and second threaded bores of the first and second members;

means for securing the first member to the newel post so as to abut the upper surface of the first member against the lower surface of the newel post; and means for securing the second member to the floor so as to abut the lower surface of the second member against the upper surface of the floor;

whereby when the first member is secured to the lower surface of the newel post and the second member is secured to the upper surface of the floor, the post is threadably anchored to the floor by being rotated so as to thread the first and second members toward each other, and whereby the fastening assembly is completely concealed within the recess between the newel post and the floor.

8. A newel post fastening assembly as recited in claim 7 wherein the means for securing the first member to the newel post and the means for securing the second member to the floor comprise:

a first plurality of holes located intermediate the first threaded bore and the perimeter of the first member;

a second plurality of holes located intermediate the second threaded bore and the perimeter of the second member;

a first plurality of threaded fasteners individually engaged with the first plurality of holes for securing the first member to the lower surface of the newel post so as to abut the upper surface of the first member against the lower surface of the newel post; and a second plurality of threaded fasteners individually engaged with the second plurality of holes for securing the second member to the floor so as to abut the lower surface of the second member against the upper surface of the floor.

9. A newel post fastening assembly as recited in claim 7 wherein the first threaded bore is centrally located in the first member and the second threaded bore is centrally located in the second member.

10. A newel post fastening assembly as recited in claim 7 wherein the first and second members are annular-shaped disks.

11. A newel post fastening assembly as recited in claim 7 wherein an axial length of the threaded stud is greater than the combined thicknesses of the first and second members.

12. A newel post fastening assembly as recited in claim 7 wherein the bearing surface of the first member and the bearing surface of the second member are both planar surfaces.

13. A method for anchoring a post to a foundation, the method comprising the steps of:

forming a recess so as to be located between the post and the foundation when the post is anchored to the foundation;

securing a first member to a lower surface of the post such that an upper surface of the first member abuts the lower surface of the post and such that an outer perimeter of the first member is circumscribed by the perimeter of the post, the first member having a first threaded bore therethrough;

securing a second member to a surface of the foundation such that a lower surface of the second member abuts the upper surface of the foundation and such that an outer perimeter of the second member will be circumscribed by the perimeter of the post once the post is anchored to the foundation, the second member having a second threaded bore therethrough; and threadably engaging a threaded stud with one of the first and second threaded bores of the first and second members, respectively;

positioning the post relative to the foundation such that the first member, the second member and the threaded stud are axially aligned;

threadably securing the post to the foundation by rotating the post relative to the foundation such that the threaded stud is threadably engaged with the first and second threaded bores of the first and second members, respectively; and threadably anchoring the post to the foundation by further rotating the post so as to thread the first and second members toward each other until the post abuts the foundation and the first and second members and the threaded stud are completely concealed within the recess between the post and the foundation.

14. A method as recited in claim 13 further comprising the step of forming the first and second members as annular-shaped disks.

15. A method as recited in claim 13 wherein the step of forming a recess between the post and the foundation comprises forming the recess in the foundation.

16. A method as recited in claim 13 wherein the step of forming a recess between the post and the foundation comprises forming the recess in the post.

17. A method as recited in claim 13 wherein the steps of securing the first member to the post and securing the second member to the floor comprise:

engaging a first plurality of threaded fasteners with holes located intermediate the first threaded bore and the perimeter of the first member, and securing the first member to the lower surface of the post with the threaded fasteners so as to abut the upper surface of the first member against the lower surface of the post; and engaging a second plurality of threaded fasteners with holes located intermediate the second threaded bore and the perimeter of the second member, and securing the second member to the floor so as to abut the lower surface of the second member against the upper surface of the floor.

18. A method as recited in claim 13 further comprising the step of providing the post as a newel post for a stair assembly, wherein the foundation is a floor.

19. A method as recited in claim 13 further comprising the step of forming a bore in the post for receiving one end of the threaded stud.

20. A method as recited in claim 13 further comprising the step of forming a bore in the foundation for receiving one end of the threaded stud.

* * * * *

UNITED STATES PATENT AND TRADEMARK OFFICE
CERTIFICATE OF CORRECTION

PATENT NO. : 5,419,538
DATED : May 30, 1995
INVENTOR(S) : Nicholas et al.

It is certified that error appears in the above-indentified patent and that said Letters Patent is hereby corrected as shown below:

Title Page, Item [19], delete "Nicholas et al.", and substitute therefor -- Nicholson et al. --.

Title Page, Item [76], line 1, delete "Thomas N. Nicholas", and substitute therefor -- Thomas N. Nicholson --.

Signed and Sealed this

Tenth Day of October, 1995

*Attest:*

BRUCE LEHMAN

*Attesting Officer*   *Commissioner of Patents and Trademarks*